US008867912B2

(12) United States Patent  
Sridhar et al.

(10) Patent No.: US 8,867,912 B2
(45) Date of Patent: Oct. 21, 2014

(54) OPTICAL SERVICE CHANNEL SYSTEMS AND METHODS OVER HIGH LOSS LINKS

(75) Inventors: Balakrishnan Sridhar, Ellicott City, MD (US); Jun Bao, Ellicott City, MD (US)

(73) Assignee: Ciena Corporation, Hanover, MD (US)

(*) Notice: Subject to any disclaimer, the term of this patent is extended or adjusted under 35 U.S.C. 154(b) by 206 days.

(21) Appl. No.: 13/606,975

(22) Filed: Sep. 7, 2012

(65) Prior Publication Data

US 2014/0072306 A1    Mar. 13, 2014

(51) Int. Cl.
*H04J 14/02* (2006.01)
*H04B 10/08* (2006.01)
*H04B 17/00* (2006.01)
*H04L 12/26* (2006.01)
*H04L 12/413* (2006.01)

(52) U.S. Cl.
USPC .............. 398/30; 398/79; 398/43; 398/16; 398/25; 398/34

(58) Field of Classification Search
CPC . H04J 14/227; H04J 14/0283; H04J 14/0212; H04B 10/0775; H05B 10/0777
USPC .............. 398/16, 25, 30, 34, 43, 79
See application file for complete search history.

(56) References Cited

U.S. PATENT DOCUMENTS

| | | | |
|---|---|---|---|
| 5,532,864 A | 7/1996 | Alexander et al. | |
| 6,222,668 B1 | 4/2001 | Dutrisac et al. | |
| 6,765,659 B1 * | 7/2004 | Bhatnagar et al. | 356/73.1 |
| 7,388,657 B2 | 6/2008 | Abbott | |
| 7,983,298 B2 * | 7/2011 | Nanda et al. | 370/468 |
| 2004/0136727 A1 | 7/2004 | Androni et al. | |
| 2005/0200945 A1 * | 9/2005 | Fella et al. | 359/334 |
| 2006/0140115 A1 * | 6/2006 | Timus et al. | 370/230 |
| 2008/0050121 A1 | 2/2008 | Evangelides et al. | |
| 2009/0052322 A1 * | 2/2009 | Simonsson et al. | 370/235 |
| 2009/0285116 A1 * | 11/2009 | Nanda et al. | 370/252 |
| 2011/0299417 A1 * | 12/2011 | Nanda et al. | 370/252 |
| 2014/0072306 A1 * | 3/2014 | Sridhar et al. | 398/79 |

* cited by examiner

*Primary Examiner* — Oommen Jacob
(74) *Attorney, Agent, or Firm* — Clements Bernard PLLC; Christopher L. Bernard; Lawrence A. Baratta, Jr.

(57) ABSTRACT

Optical service channel (OSC) systems and methods over high loss links are described utilizing redundant telemetry channels. A first telemetry channel provides a low bandwidth communication channel used when Raman amplification is unavailable on a high loss link for supporting a subset of operations, administration, maintenance, and provisioning (OAM&P) communication. A second telemetry channel provides a high bandwidth communication channel for when Raman amplification is available to support full OAM&P communication. The first and second telemetry operate cooperatively ensuring nodal OAM&P communication over high loss links (e.g., 50 dB) regardless of operational status of Raman amplification.

20 Claims, 4 Drawing Sheets

OPTICAL SERVICE CHANNEL SYSTEMS AND METHODS OVER HIGH LOSS LINKS

FIELD OF THE INVENTION

Generally, the field of art of the present disclosure pertains to fiber optic systems and methods, and more particularly, to optical service channel (OSC) systems and methods over high loss links such as festoon applications.

BACKGROUND OF THE INVENTION

Conventionally, optical service channels or optical supervisory channels (collectively referred to as OSCs herein) provide a wavelength on a link between two nodes for data communications there between. That is, OSCs are an additional wavelength in a wavelength division multiplexing (WDM) system usually outside the erbium doped fiber (EDFA) amplification band (e.g., at 1510 nm, 1620 nm, 1310 nm or another proprietary wavelength). This data communications is generally for operations, administration, maintenance, and provisioning (OAM&P) functionality such as information about WDM signals on the link as well as remote conditions at the two nodes. Additionally, the OSCs can provide remote software upgrades, network management connectivity, user data channel connectivity, etc. ITU standards suggest that the OSC should utilize an Optical Carrier (OC) OC-3 signal structure, though some have opted to use a 100 megabit Ethernet or another signal format. Typically, OSCs have a set maximum link budget. For example, a standard small form factor pluggable (SFP)-based OSC with as an OC-3 at 1510 nm has a link budget of about 42 dB. While 42 dB covers a large majority of fiber links, it does not cover festoon applications, channel crossings, or other high loss link applications. These high loss link applications can include Raman amplification, however the presence of Raman amplifiers does not improve the link budget of a typical 1510 nm OC-3 OSC because of injected amplifier stimulated emissions (ASE). That is, the high loss link applications do not realize any improvements with the OSC even with the Raman amplifiers on, due to a large optical receiver bandwidth at the Receiver and the inability to reject the Raman ASE. Even if the OSCs were adapted to support Raman amplification, the OSCs would not support communication the high loss link applications if the Raman amplifiers were turned off. Additionally, conventional OSCs are typically a single point of failure thus an OSC failure cannot be distinguished from a link failure. This happens in high loss link applications because the signal power from the far end is indistinguishable from the locally generated Raman ASE. All of the foregoing presents difficult challenges in high loss link applications.

BRIEF SUMMARY OF THE INVENTION

In an exemplary embodiment, an optical system over a high loss link, includes a first node; a second node; an optical fiber link communicatively coupling the first node to the second node, wherein the optical fiber link includes a high loss link; a high bandwidth communication channel providing full operations, administration, maintenance, and provisioning (OAM&P) communication between the first node and the second node over the optical fiber link; a low bandwidth communication channel providing a subset of OAM&P communication between the first node and the second node over the optical fiber link; and a controller at each of the first node and the second node for operating concurrently and selecting between the high bandwidth communication channel and the low bandwidth communication channel based on a plurality of operational factors associated with the optical system. The high bandwidth communication channel and the low bandwidth communication channel operate in combination with one another based on the plurality of operational factors associated with the optical system. The plurality of operational factors can include presence of Raman gain in the optical fiber link, overall loss on the optical fiber link, and launch power of the high bandwidth communication channel. The optical system can further include Raman amplification on the optical fiber link; wherein the low bandwidth communication channel is configured to operate when the Raman amplification is not operational on the optical fiber link and when the high bandwidth communication channel cannot support losses on the optical fiber link.

The low bandwidth communication channel can be configured to coordinate and sequence diagnostic and calibration functions at the first node and the second node in conjunction with establishing the Raman amplification. The low bandwidth communication channel can be configured to communicate a low bandwidth status word to indicate status of the first node to the second node, optical time domain reflectometer (OTDR) trace data, and back reflection measurements. The low bandwidth communication channel can include two discrete tones with an adjustable modulation depth on a first wavelength. The high bandwidth communication channel can include a second wavelength configured to receive the Raman amplification, and wherein a narrow bandwidth receiver filter can be utilized to remove amplified spontaneous emissions in the second wavelength due to the Raman amplification. The second wavelength can be implemented through a pluggable optical module at each of the first node and the second node. Optionally, the low bandwidth communication channel and the high bandwidth communication channel can each propagate in a same direction over the optical fiber link. Alternatively, the low bandwidth communication channel and the high bandwidth communication channel each propagate in a different directions over the optical fiber link with the high bandwidth communication channel propagating counter to the low bandwidth communication channel and any payload channels on the optical fiber link. The low bandwidth communication channel can be utilized to provide an estimate of Raman gain associated with the Raman amplification by taking a difference of power associated with the low bandwidth communication channel with the Raman amplification off from difference of power associated with the low bandwidth communication channel with the Raman amplification on.

Optionally, the second node includes a first subsystem providing Raman wavelengths to the optical fiber link towards the first node; a second subsystem receiving a first wavelength for the low bandwidth communication channel; and a third subsystem receiving a second wavelength for the high bandwidth communication channel, wherein the second wavelength is terminated on a pluggable optical module and narrowband filtered prior to the pluggable optical module; and the first node includes a first subsystem monitoring the Raman wavelengths to the optical fiber link towards the second node; a second subsystem transmitting the first wavelength for the low bandwidth communication channel, wherein the first wavelength is further configured to provide optical time domain reflectometer (OTDR) functionality; and a third subsystem transmitting the second wavelength for the high bandwidth communication channel, wherein the second wavelength is created on the pluggable optical module. Alternatively, the second node includes a first subsystem providing Raman wavelengths to the optical fiber link towards the first node; a second subsystem receiving a first wavelength for the low bandwidth communication channel; and a third subsystem transmitting a second wavelength for the high bandwidth communication channel, wherein the second wavelength is created on a pluggable optical module and counter propagates relative to payload carrying signals on the optical fiber link; and the first node includes a first subsystem monitoring the Raman wavelengths to the optical fiber link towards the second node; a second subsystem transmitting the first wavelength for the low bandwidth communication channel, wherein the first wavelength is further configured to provide optical time domain reflectometer (OTDR) functionality; and a third subsystem receiving the second wavelength for the high bandwidth communication channel, wherein the second wavelength is terminated on the pluggable optical module and narrowband filtered prior to the pluggable optical module.\

In another exemplary embodiment, an optical node includes a Raman amplifier coupled to an external fiber span with high loss and providing counter propagating Raman pump wavelengths to the external fiber span via a first filter; a second filter providing a first communication channel to a first module, wherein the first communication channel includes a high bandwidth communication channel providing full operations, administration, maintenance, and provisioning (OAM&P) communication with a downstream node on the external fiber span; a third filter providing a second communication channel to a second module, wherein the second communications channel includes a low bandwidth communication channel providing a subset of OAM&P communication with the downstream node on the external fiber span; and a controller for operating concurrently and selecting between a high bandwidth communication channel and a low bandwidth communication channel based on a plurality of operational factors. The plurality of operational factors can include whether the Raman amplifier is operational, overall loss on the external fiber span, and launch power of the high bandwidth communication channel. The first communication channel can include a first wavelength modulated with two discrete tones with an adjustable modulation depth; and the second communication channel can include a second wavelength which is amplified by the counter propagating Raman pump wavelengths and narrowband filtered to remove any amplified spontaneous emissions from the counter propagating Raman pump wavelengths.

In yet another exemplary embodiment, an operational method for telemetry over a high loss optical link includes operating a low bandwidth channel with Raman amplification off on the high loss optical link; utilizing the low bandwidth channel to communicate a subset operations, administration, maintenance, and provisioning (OAM&P) data over the high loss optical link to enable turn up of the Raman amplification; when the Raman amplification is on, operating a high bandwidth channel on the high loss link; and utilizing the high bandwidth channel to communicate full OAM&P data over the high loss optical link. The operational method can further include operating the high bandwidth channel in a counter propagating manner from the low bandwidth channel; and transmitting the low bandwidth channel in a co propagating manner with payload channels on the high loss optical link. The operational method can further include narrowband filtering the high bandwidth channel to remove amplified spontaneous emissions from the Raman amplification. The operational method can further include operating the high bandwidth channel on the high loss link and having the Raman amplification turned off; and reverting to the low bandwidth channel upon loss of the Raman amplification.

BRIEF DESCRIPTION OF THE DRAWING(S)

Exemplary and non-limiting embodiments of the present disclosure are illustrated and described herein with reference to various drawings, in which like reference numbers denote like method steps and/or system components, respectively, and in which.

DETAILED DESCRIPTION OF THE INVENTION

In various exemplary embodiments, the present disclosure provides optical service channel (OSC) systems and methods over high loss links such as festoon applications. Variously, the OSC systems and methods support a high bandwidth communication channel and a low bandwidth communication channel working together over high loss links such as links with span losses greater than 50 dB. The high bandwidth communication channel can use high gain forward error correction (FEC) and distributed Raman gain amplifier to support increased bandwidth relative to the low bandwidth communication channel. The low bandwidth communication channel operates on the same high loss span as the high bandwidth communication channel with limited performance when the distributed Raman gain amplifier is unavailable. The operations of the communication channels can be implemented in a state machine which provides communication between two nodes over a high loss span as long as there is fiber connectivity therebetween and regardless of whether Raman amplification is available. Advantageously, the OSC systems and methods enable a working telemetry channel in Raman enabled high loss links that can be used to 1) automate turn-up of Raman Amplifiers, 2) co-relate, isolate and trouble shoot faults, and 3) offer all the Raman safety features in the link. This removes the conventional requirement such as in existing festoon applications for manual intervention for some or all of these functions. Advantageously, the OSC systems and methods enable automation (e.g., through turn-up to shutdown) of high loss links reducing manually intervention requirements.

The low bandwidth communication channel can include use of a low bandwidth tone to allow signaling across the nodes at turn-up when the Raman amplifier is off. The tone can also be used to exchange a low bandwidth status word, to indicate the status of the nodes. The low bandwidth tone can also be used to enable and sequence diagnostic function such as OTDR trace, back reflection measurements, etc. Once the OTDR and other measurements are turned on, the Raman Amplifier can be enabled. This allows a higher capacity telemetry channel, i.e. the high bandwidth communication channel, to work across the link. The higher capacity telemetry channel operates within the Raman amplifier bandwidth and experiences gain from the Raman Amplifier. The high bandwidth communication channel includes a narrow bandwidth receiver filter to block the ASE from the Raman amplification to improve the link budget of the telemetry signals. If there is any service interruption that results in the shutdown of the Raman Amplifier, the communication between the nodes can revert to the low bandwidth communication channel.

Figure 1:
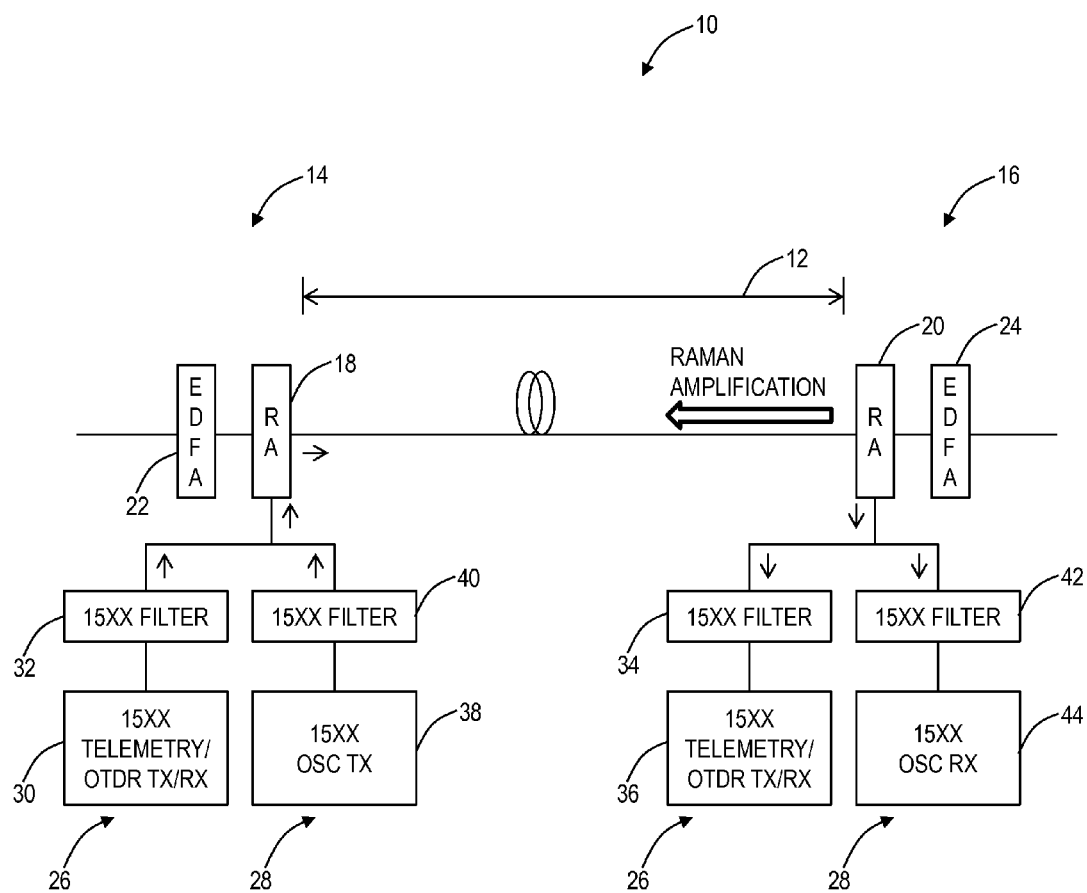
FIG. 1 is a block diagram of an optical system for transmission of WDM signals over a high loss link.

Referring to FIG. 1, in an exemplary embodiment, a block diagram illustrates an optical system 10 for transmission of WDM signals over a high loss link 12. The optical system 10 includes two nodes 14, 16 interconnected optically via the high loss link 12. For example, the high loss link 12 can be a festoon fiber optic link with losses above 50 dB. For illustration purposes, FIG. 1 shows a unidirectional link in the high loss link 12 without showing additional components at each of the nodes 14, 16 such as transceivers, client equipment, etc. That is, FIG. 1 book ends the optical system between optical amplifiers to illustrate the OSC systems and methods. The node 14 is the transmit side and the node 16 is the receive side. The high loss link 12 is bookended by Raman amplifiers 18, 20 at the nodes 14, 16 respectively, and EDFAs 22, 24 are also shown coupled to the Raman amplifiers 18, 20 respectively. From a signal propagation perspective, WDM signals (not shown) are transmitted through the EDFA 22 and the Raman amplifier 18 over the high loss link 12 to the Raman amplifier 20 and the EDFA 24. The Raman amplifier 20 can provide counter propagating Raman amplification over the high loss link 12. Optionally, the Raman amplifier 18 can provide co propagating Raman amplification over the high loss link 12.

From an OSC/telemetry perspective, the optical system 10 includes two OSC/telemetry signals. As described herein, the OSC systems and methods relate to communications between two nodes across high loss links. The OSC systems and methods can refer to OSCs (i.e., optical service channel or optical supervisory channel), telemetry channels, communications channels, management channels, etc. all for the same functionality of a signal that enables communication between the nodes 14, 16 over the high loss link 12. In various exemplary embodiments, the optical system 10 supports two telemetry channels 26, 28 between the nodes 14, 16 that are tapped in/out prior to the EDFAs 22, 24. The two telemetry channels 26, 28 can be referred to as a low bandwidth communication channel (i.e., a 15XX telemetry/optical time domain reflectometer (OTDR) channel 26) and a high bandwidth communication channel (i.e., an OSC 28) that work in conjunction with one another. As described herein, 15XX is a wavelength between 1500 nm and 1599 nm, i.e. XX equals 00-99. In practical embodiments, 15XX for the channels 26, 28 will generally exclude the EDFA amplification band (e.g., 1535-1560 nm) as this is typically used for WDM signals.

The channel 26 can be the low bandwidth communication channel that is also configured to perform OTDR functionality through the Raman amplifier 18 as well as to monitor Raman amplification gain. The channel 26 is created by a 15XX telemetry/OTDR transceiver 30 at the node 14 which is inserted into a line associated with the high loss link 12 and the Raman amplifier 18 via a 15XX filter 32. For example, the channel 26 can be a 1527 nm wavelength, and the filter 32 can be a coarse filter combining the 1527 nm wavelength with a broadband range of wavelengths such as 1530-1565 nm. Thus, the filter 32 is configured to selectively insert the channel 26 into the high loss link 12. The channel 26 is received at the node 16 and selectively removed by a 15XX filter 34 that performs substantially the opposite functionality of the filter 32. Finally, the channel 26 is received at a transceiver 36 for demodulation of any information modulated on the channel 26. For example, the channel 26 can be modulated with an analog modulated (AM) tone, such as two discrete tones. The tone can be enabled only when the span loss is greater than a certain threshold and straightforward power detection is not reliable. The channel 26 is used to establish a low data rate between the two nodes 14, 16 that will work for very high span losses without requiring Raman amplification. Further, the modulation depth of the tone can be changed based on operating condition of the optical system 10. For example, the modulation depth can be high, before the Raman amplifiers 18, 20 are turned off and there is no traffic across the link. The modulation depth is reduced after the Raman amplifiers 18, 20 are turned on and there is traffic on the link. This reduces cross talk from the tone on the WDM payload channels. Also, the tone can be turned off if the high loss link 12 can support OSC 28 with the Raman amplifiers 18, 20 are turned off. Also, in addition to providing the low bandwidth tones, the transceiver 30 can be used for OTDR and for monitoring Raman gain over the high loss link 12.

Concurrent with the channel 26, the optical system 10 can include the OSC 28 which can be a separate OSC wavelength (e.g., an OC-3 SFP pluggable module) that is used for the high bandwidth communication channel such as when the Raman amplifiers 18, 20 are on or where supported without the Raman amplifiers 18, 20 being on. The OSC 28 is created by 15XX OSC TX 38 at the node 14 which is inserted into a line associated with the high loss link 12 and the Raman amplifier 18 via a 15XX filter 40. For example, the OSC 28 can be a 1517 nm wavelength (or any other wavelength), and the filter 40 can be a coarse filter combining the 1517 nm wavelength with a broadband range of wavelengths such as 1530-1565 nm. Thus, the filter 40 is configured to selectively insert the OSC 28 into the high loss link 12. Collectively, the filters 32, 34, 40, 42 can be referred to as coarse WDM filters which are configured to add/drop wavelengths out of the EDFA amplification band (e.g., 1530-1565 nm) with the EDFA amplification band. The OSC 28 is received at the node 16 and selectively removed by a 15XX filter 42 that performs substantially the opposite functionality of the filter 40. Finally, the OSC 28 is received at a receiver 44 for demodulation of any information modulated on the OSC 28.

The channels 26, 28 can in principle be at the same wavelength. In an exemplary embodiment of the OSC systems and method, separate wavelengths are used by the channels 26, 28 to allow for redundancy in link monitoring and also preserving a legacy OSC link (CWDM SFPs with CWDM drop filters). There are other possible benefits to having two different wavelengths for the channels 26, 28 to besides providing redundancy. First, as discussed herein, the channels 26, 28 can be used to provide an estimate of Raman gain of the Raman amplifiers 18, 20. In an exemplary algorithm, fiber loss of the high loss link 12 can be set at a baseline with the Raman amplifiers 18, 20 off Once the Raman amplifiers 18, 20 are activated, the different in loss can be used to estimate Raman gain of the Raman amplifiers 18, 20. For example, the channel 26 can be received at a first power level with the Raman amplifiers 18, 20 off and a second power level with the Raman amplifiers 18, 20 on; the difference being indicative of gain associated with the Raman amplifiers 18, 20. Also, differential loss measurements could be used to distinguish if the change in the apparent loss of the high loss link 12 is due to change in distributed Raman Amplifier gain or change in fiber loss. One of the wavelengths of the channels 26, 28 can be selected so that the Raman gain is low or zero, while the other wavelength of the channels 26, 28 is selected so that the Raman gain is high. The differential loss change at the two wavelengths can be used to estimate if the loss change was primarily due to change in the fiber loss of change in Raman gain of the amplifier.

In another exemplary embodiment of the optical system 10, the channels 26, 28 can be propagating in opposite directions. For example, the channel 26 can be a co-propagating tone with WDM wavelengths and the OSC 28 can be counter or backward propagating relative to the channel 26 and the WDM wavelengths. The counter propagating OSC 28 would solve some of the issues described in the previous sections. For example, cross talk from OSC modulation impacts coherent WDM channels when they are co-propagating in the high loss link 12. However, if the OSC 28 is counter propagating, there is a large walk off between the OSC 28 and the WDM channels. Thus, the launch power of the OSC 28 channels can be increased significantly. Also, the OSC 28 can take advantage of Raman Gain. In the counter propagating embodiment, the impact of Raman ASE is minimal, because the amplification happens at the beginning of the high loss link 12, rather than at the end of the high loss link 12, where the OSC 28 power is low. One of the benefits of a counter propagating (i.e., backward propagating) OSC (especially one with a low bandwidth like the OSC compared to the payload channels), is that the non-linear cross-talk is negligible due to the quick walk-off. Also, bi-directional OSC channels, i.e. the counter propagating OSC channel 28 and the channel 26, also has an advantage in reducing the time required for safety shutdown such as when there is both forward and backward propagating Raman amplifiers.

Figure 2:
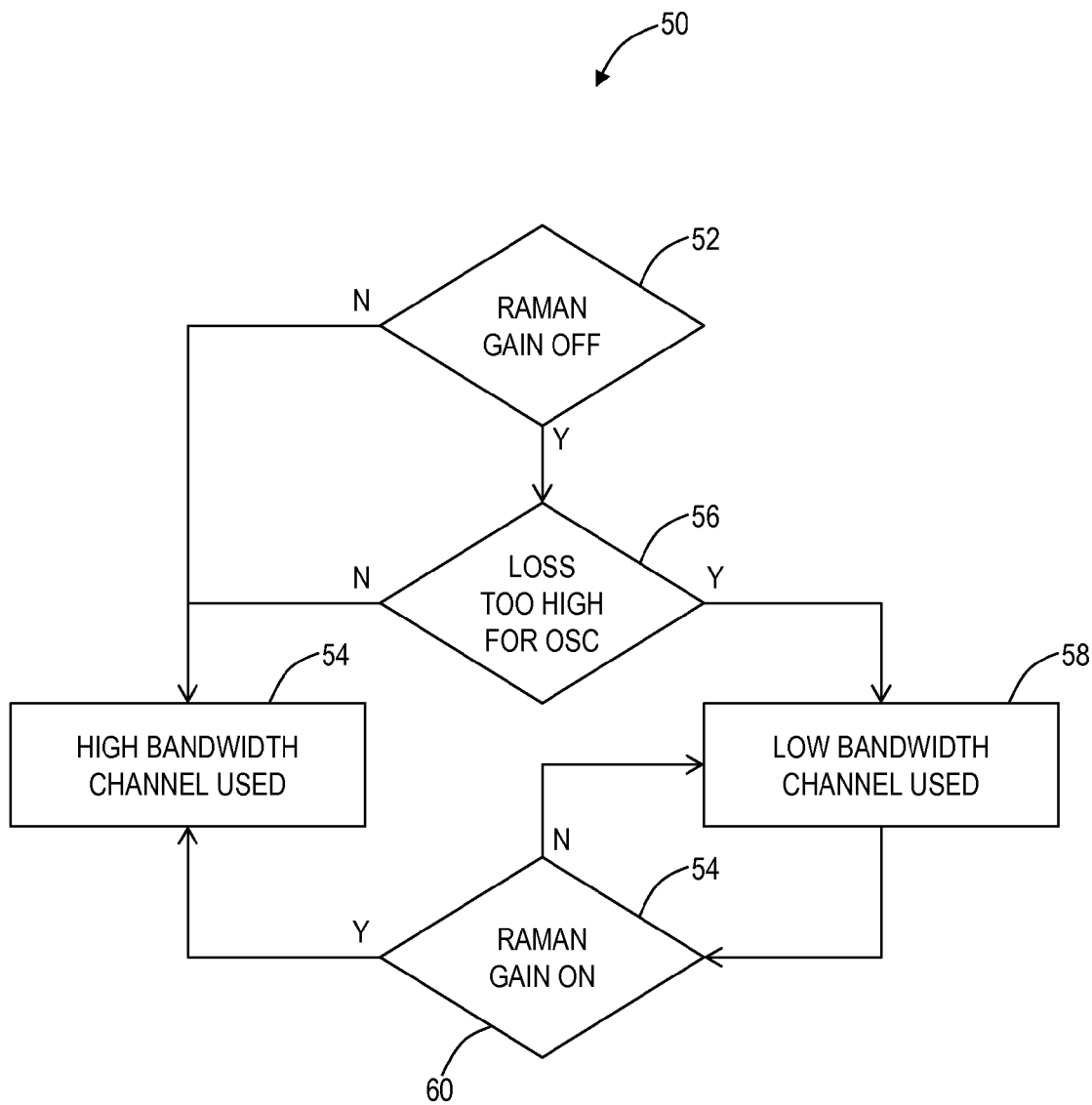
FIG. 2 is flow chart of an operational method associated with OSC/telemetry channels in the optical system of FIG. 1.

Referring to FIG. 2, in an exemplary embodiment, a flow chart illustrates an operational method 50 associated with the channels 26, 28 in the optical system 10. The channels 26, 28 can operate together ensuring there is communication between the nodes 14, 16 regardless of an operational state of the Raman amplifiers 18, 20. An objective of the operational method 50 is to ensure there is communication between the two nodes 14, 16 of the optical system 10. In the context of the operational method 50, the channel 26 can be referred to as a low bandwidth channel, and the channel 28 can be referred to as a high bandwidth channel. Further, the operational method 50 can continuously operate as long as the optical system 10 is operational, and the operational method 50 can be initiated at any of the steps. If Raman gain is not off (step 52), then the operational method 50 can utilize the high bandwidth channel (step 54). If the Raman gains is off (step 52) and loss on the high loss span 12 is not too high for the OSC (step 56), then the operational method 50 can utilize the high bandwidth channel (step 54). If the loss is too high for the OSC (step 56), then the operational method 50 can utilize the low bandwidth channel (step 58). The operational method 50 can continue to utilize the low bandwidth channel until Raman gain is on (step 60) and then utilize the high bandwidth channel.

The low bandwidth channel is used for setup and turn up of the high loss link 12. That is, the low bandwidth channel includes low bandwidth that would work in the absence of Raman gain. Generally, the low bandwidth channel is used to coordinate and sequence diagnostic and calibration functions at the two nodes 14, 16. That is, the low bandwidth channel is generally a reduced bandwidth OAM&P channel focused on limited functions to enable turn up of the Raman amplifiers 18, 20 and the like. As described herein, the low bandwidth channel can use tones with a settable modulation depth to take advantage of the Raman gain in the system 10. As shown in the operational method 20, the low bandwidth channel is activated in event of a Raman shutdown for recovery in the system 10. The high bandwidth channel has increased bandwidth from the low bandwidth channel and is configured to operate with the Raman gain available (or without if supported with the reach). In an exemplary embodiment, the high bandwidth channel is an out-of-band signal such as a 1510 nm OC-3. In another exemplary embodiment, the high bandwidth channel could be a WDM channel. It is expected that the high bandwidth channel supports full OAM&P functionality between the nodes 14, 16 whereas the low bandwidth channel supports a reduced subset of OAM&P functionality.

Also, as described herein, the high bandwidth channel can be counter propagating with respect to the payload channels to improve link budget. The low bandwidth channel can use tone channels at a single source with a variable data rate. Further, the low bandwidth channel and the high bandwidth channel can be different wavelengths with separate transmitters and receivers. This improves reliability, by providing redundant means to verify link continuity with the Raman gain present, provides an ability to estimate measurements of the fiber loss and Raman gain, and differential power measurements at the two wavelengths can be used to isolate problems with changes in fiber loss and Raman Gain.

Figure 3:
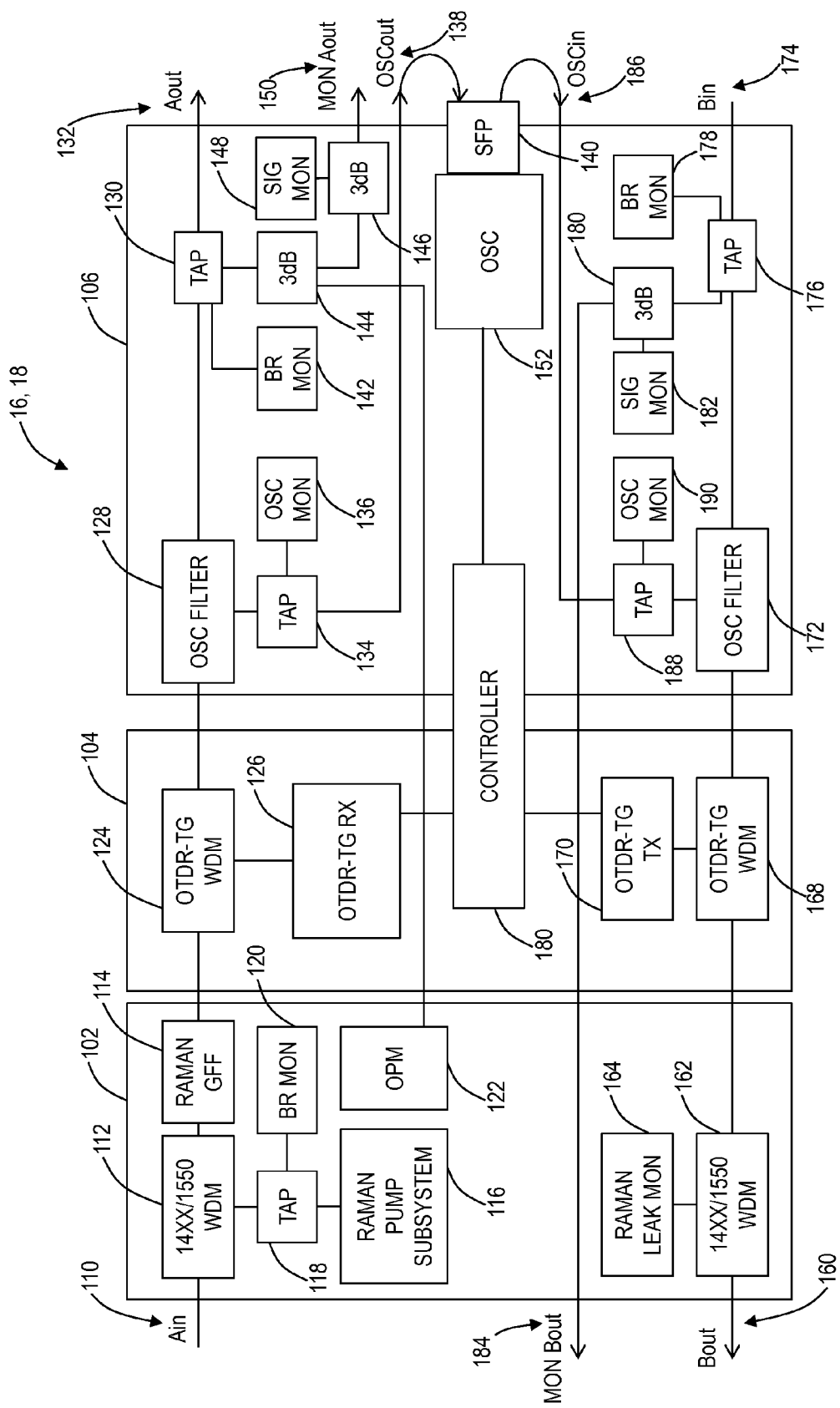
FIG. 3 is a block diagram of an exemplary implementation of the Raman amplifiers for use in the optical system of FIG. 1.

Referring to FIG. 3, in an exemplary embodiment, a block diagram illustrates an exemplary implementation of the Raman amplifiers 16, 18 for use in the optical system 10. The Raman amplifiers 16, 18 support two fibers, A and B, and in context of the optical system 10, the Raman amplifier 16 uses the A fiber and associated components and the Raman amplifier 18 uses the B fiber and associated components. Of course, there can be a second fiber in the optical system 10 (not shown) where the Raman amplifier 16 uses the B fiber and associated components and the Raman amplifier 18 uses the A fiber and associated components. The Raman amplifier 16, 18 can be grouped into three internal subsystems 102, 104, 106, namely a pump subsystem 102, an OTDR-TG (Telemetry Gain) subsystem 104, and an OSC subsystem 106. Of course, other configurations of the Raman amplifier 16, 18 are also contemplated herein. For example, the functionality of the subsystems 102, 104, 106 can be integrated into a single system. Those of ordinary skill in the art will recognize that the Raman amplifier 16, 18 is presented as an exemplary embodiment, and the OSC systems and methods described herein contemplate use with any embodiment of a Raman amplifier.

Also, it should be appreciated by those of ordinary skill in the art that the amplifier 16, 18 is depicted in an oversimplified manner, and a practical embodiment may include additional components and suitably configured processing logic to support known or conventional operating features that are not described in detail herein. Generally, the pump subsystem 102 is configured to provide the Raman amplification into the high loss link 12, the OTDR-TG subsystem 104 is configured to provide OTDR functionality and the functionality of the telemetry channel 26, i.e. the low bandwidth channel, and the OSC subsystem 106 is configured to provide the functionality of the OSC 28, i.e. the high bandwidth channel. The functionality and the components associated with each of these subsystems 102, 104, 106 is now described from the perspective of the A and B fibers.

With respect to the A fiber, the Raman amplifier 16, 18 includes an $A_{in}$ port 110 which receives signals from an external fiber such as the high loss link 12. In the optical system 10, the $A_{in}$ port 110 is where the high loss link 12 connects to the Raman amplifier 18 at the node 16. A 14XX/1550 WDM filter 112 receives the $A_{in}$ port 110 and is configured to send WDM wavelengths (e.g., 1500 and above) to a Raman gain flattening filter (GFF) 114 and simultaneously combine 14XX Raman pump wavelengths from a Raman pump subsystem 116. The 14XX Raman pump wavelengths are counter propagating to the WDM wavelengths. A small power tap 118 (e.g., 1-5%) can couple a portion off the connection of the Raman pump subsystem 116 to the 14XX/1550 WDM filter 112 to monitor for Raman back reflections (BR) via a BR monitor 120. An optical power monitor (OPM) 122 can also monitor an output of the A fiber.

The Raman GFF 114 is configured to flatten the spectrum of the various WDM signals following the Raman amplification in the external fiber. The Raman GFF 114 connects to an OTDR-TG WDM filter 124 in the OTDR-TG subsystem 104. The WDM filter 124 is configured to separate the WDM wavelengths (e.g., 1530-1565 nm) from the telemetry channel 26 wavelength. As described herein, in an exemplary embodiment, the telemetry channel 26 wavelength can be 1527 nm. The OTDR-TG subsystem 104 includes an OTDR-TG receiver (RX) 126 coupled to the WDM filter 124. The OTDR-TG RX 126 is configured to receive the telemetry channel 26 wavelength and for the low bandwidth signal, demodulate any tones on the telemetry channel 26 wavelength. The WDM filter 124 also connects to an OSC filter 128 in the OSC subsystem 106. The OSC filter 128 is configured to split out the OSC channel 28 from the WDM wavelengths, i.e. similar functionality to the WDM filter 124.

An output of the OSC filter 128 for the WDM wavelengths connects to a small power tap 130 which taps off a portion of output power but provides the majority of the output power to an $A_{out}$ port 132 out of the Raman amplifier 16, 18. An output of the OSC filter 128 for the OSC 28 connects to a small power tap 134 which provides a small amount of power to an OSC monitor 136. The majority of optical power from the power tap 134 connects to an $OSC_{out}$ port 138 which connects to a receiver on an SFP module 140. Thus, the OSC 28 is formed through a DWDM SFP pluggable module or other types of pluggable modules. The OSC subsystem 106 also includes a back reflection (BR) monitor 142 and a splitter (3 dB) 144 coupled to the power tap 130. The BR monitor 142 can check for any back reflections from the $A_{out}$ port 132. The splitter 144 connects to the OPM 122 and to another splitter 146 which connects to a signal monitor 148 and an external monitor port 150. The OSC subsystem 106 also includes an OSC module 152 coupled to the SFP 140. The OSC module 152 includes various opto-electronic components for processing of the OSC 28.

With respect to the B fiber, the Raman amplifier 16, 18 includes an $B_{out}$ port 160 which outputs signals to an external fiber such as the high loss link 12. In the optical system 10, the $B_{out}$ port 160 is where the high loss link 12 connects to the Raman amplifier 16 at the node 14. The $B_{out}$ port 160 is connected to another 14XX/1550 WDM filter 162 which splits off the 14XX bandwidth to a Raman leakage monitor 164. The 14XX/1550 WDM filter 162 is connected to another OTDR-TG WDM filter 168 which splits combines the telemetry channel 26 from an OTDR-TG transmitter (TX) 170 with other wavelengths (e.g., WDM wavelengths and the OSC 28). The OTDR-TG TX 170 is configured to transmit the channel 26 with the tones modulated thereon. The OTDR-TG TX 170 can also transmit a wavelength for the channel 26 to perform OTDR functionality.

The OTDR-TG WDM filter 168 is connected to another OSC filter 172 in the OSC subsystem 106. The OSC filter 172 combines the OSC 28 with WDM signals. For example, the WDM signals can be input through a $B_{in}$ port 174 which connects to a small power tap 176. The majority of the output power from the power tap 176 is sent to the OSC filter 172 and smaller portions are provided to a back reflection (BR) monitor 178 and a splitter 180. The BR monitor 178 can be configured to check for back reflections from the $B_{in}$ port 174. The splitter 180 connects to a signal monitor 182 and an external monitor port 18. The SFP 140 provides the OSC 28 to an OSC input port 186 on the OSC subsystem 106 where it is connected to a small power tap 188 which taps a small portion of power to an OSC monitor 190 and provides the majority of power to the OSC filter 172.

Figure 4:
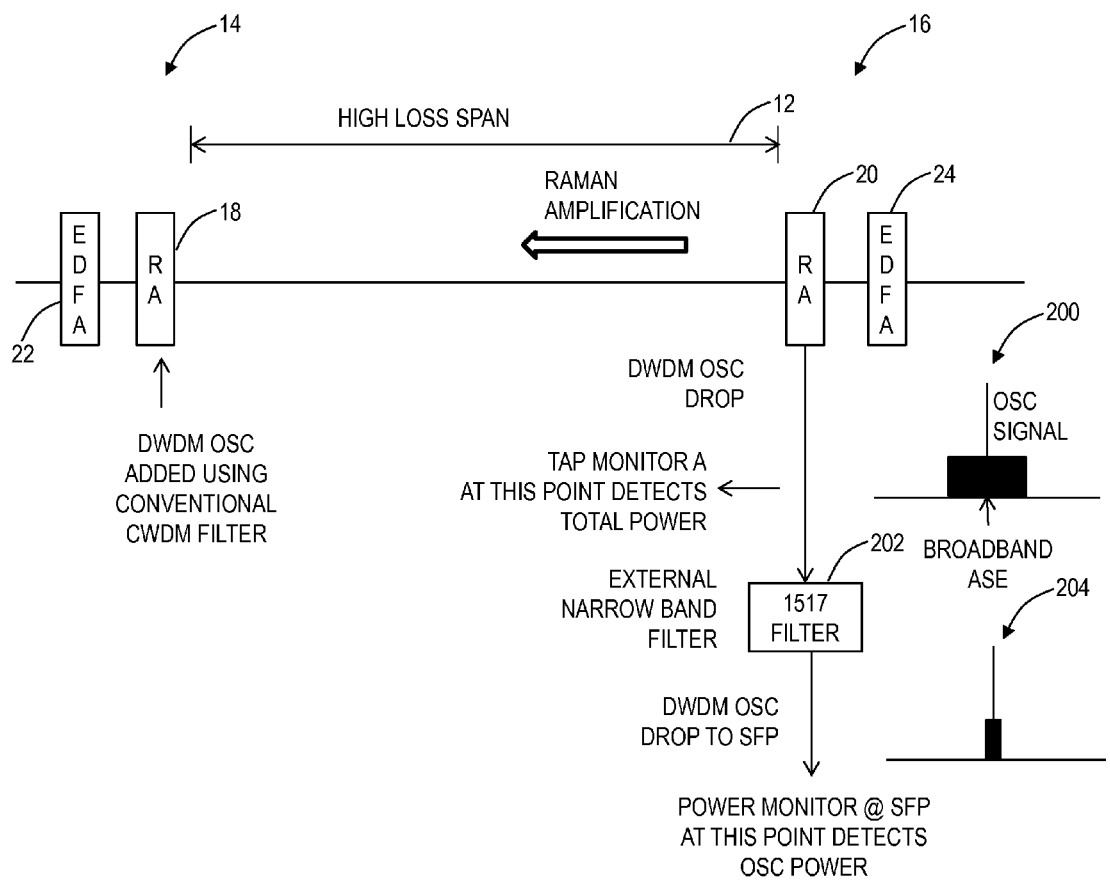
FIG. 4 is a block diagram of operation of an OSC channel in the optical system of FIG. 1 supporting Raman amplification on the OSC channel.

Referring to FIG. 4, in an exemplary embodiment, a block diagram illustrates operation of the OSC 28 channel in the OSC systems and methods. In context of the OSC systems and methods, it is desirable for the OSC 28 to support Raman amplification from the Raman amplifiers 16, 18 to support the high loss link 12. FIG. 4 illustrates various techniques applied to the OSC 28 to support the high loss link 12. First, as described in FIG. 3, the OSC 28 can be implemented through a DWDM SFP or equivalent. Such a module has formatting and launch power applicable to high loss applications. Also, DWDM SFP modules are available with high gain FEC and even with impairment mitigation built in (e.g., chromatic dispersion compensation). The OSC 28 can be inserted at the node 14 using a conventional CWDM filter. With the use of a DWDM SFP, it is expected that the OSC 28 receives Raman gain similar to the WDM payload channels on the high loss link 12. At the node 16, the OSC 28 is dropped and includes broadband ASE noise (see graph 200 in FIG. 4).

The OSC monitor 136 can be used to detect total power of the OSC 28. Next, the OSC 28 can be provided to an external narrowband filter 202. For example, assuming the OSC 28 and the DWDM SFP are at 1517 nm, the external narrowband filter 202 can remove the broadband ASE noise and provide the OSC 28 as shown in graph 204. The external narrowband filter 202 can be the OSC filter 128 or another filter. Following the external narrowband filter 202, the OSC 28 is provided to the SFP 140 for termination thereof. In an exemplary embodiment, the SFP 140 can be a custom DWDM SFP and the external narrowband filter 202 can be separate from the OSC filter 128 (which can be referred to as a CWDM filter). The external narrowband filter 202 is used after the CWDM filter to reject the Raman ASE from the OSC 28 channel.

Additionally, the Raman amplifier 16, 18 can include a controller 180 communicatively coupled to the OSC 152, the OTDR-TG RX 126, and the OTDR-TG TX 170. The controller can be configured for operating concurrently and selecting between the high bandwidth communication channel and the low bandwidth communication channel based on a plurality of operational factors associated with the optical system. In conjunction with the optical system 10, the nodes 12, 14, and the operational method 50, it will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. In an exemplary embodiment, the aforementioned components can generally be referred to as the controller 180 at each of the nodes 12, 14 for operating concurrently and selecting between the high bandwidth communication channel and the low bandwidth communication channel based on a plurality of operational factors associated with the optical system.

Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure and are intended to be covered by the following claims.

What is claimed is:

1. An optical system over a high loss link, comprising:
a first node;
a second node;
an optical fiber link communicatively coupling the first node to the second node, wherein the optical fiber link comprises a high loss link;
a high bandwidth communication channel providing full operations, administration, maintenance, and provisioning (OAM&P) communication between the first node and the second node over the optical fiber link;
a low bandwidth communication channel providing a subset of OAM&P communication between the first node and the second node over the optical fiber link; and
a controller at each of the first node and the second node for operating concurrently and selecting between the high bandwidth communication channel and the low bandwidth communication channel based on a plurality of operational factors associated with the optical system.

2. The optical system of claim 1, wherein the plurality of operational factors comprise presence of Raman gain in the optical fiber link, overall loss on the optical fiber link, and launch power of the high bandwidth communication channel.

3. The optical system of claim 1, further comprising:
Raman amplification on the optical fiber link;
wherein the low bandwidth communication channel is configured to operate when the Raman amplification is not operational on the optical fiber link and when the high bandwidth communication channel cannot support losses on the optical fiber link.

4. The optical system of claim 3, wherein the low bandwidth communication channel is configured to coordinate and sequence diagnostic and calibration functions at the first node and the second node in conjunction with establishing the Raman amplification.

5. The optical system of claim 4, wherein the low bandwidth communication channel is configured to communicate a low bandwidth status word to indicate status of the first node to the second node, optical time domain reflectometer (OTDR) trace data, and back reflection measurements.

6. The optical system of claim 3, wherein the low bandwidth communication channel comprises two discrete tones with an adjustable modulation depth on a first wavelength.

7. The optical system of claim 6, wherein the high bandwidth communication channel comprises a second wavelength configured to receive the Raman amplification, and wherein a narrow bandwidth receiver filter is utilized to remove amplified spontaneous emissions in the second wavelength due to the Raman amplification.

8. The optical system of claim 7, wherein the second wavelength is implemented through a pluggable optical module at each of the first node and the second node.

9. The optical system of claim 3, wherein the low bandwidth communication channel and the high bandwidth communication channel each propagate in a same direction over the optical fiber link.

10. The optical system of claim 3, wherein the low bandwidth communication channel and the high bandwidth communication channel each propagate in a different directions over the optical fiber link with the high bandwidth communication channel propagating counter to the low bandwidth communication channel and any payload channels on the optical fiber link.

11. The optical system of claim 3, wherein the low bandwidth communication channel is utilized to provide an estimate of Raman gain associated with the Raman amplification by taking a difference of power associated with the low bandwidth communication channel with the Raman amplification off from difference of power associated with the low bandwidth communication channel with the Raman amplification on.

12. The optical system of claim 1, wherein:
the second node comprises:
a first subsystem providing Raman wavelengths to the optical fiber link towards the first node;
a second subsystem receiving a first wavelength for the low bandwidth communication channel; and
a third subsystem receiving a second wavelength for the high bandwidth communication channel, wherein the second wavelength is terminated on a pluggable optical module and narrowband filtered prior to the pluggable optical module; and
the first node comprises:
a first subsystem monitoring the Raman wavelengths to the optical fiber link towards the second node;
a second subsystem transmitting the first wavelength for the low bandwidth communication channel, wherein the first wavelength is further configured to provide optical time domain reflectometer (OTDR) functionality; and
a third subsystem transmitting the second wavelength for the high bandwidth communication channel, wherein the second wavelength is created on the pluggable optical module.

13. The optical system of claim 1, wherein:
the second node comprises:
a first subsystem providing Raman wavelengths to the optical fiber link towards the first node;
a second subsystem receiving a first wavelength for the low bandwidth communication channel; and
a third subsystem transmitting a second wavelength for the high bandwidth communication channel, wherein the second wavelength is created on a pluggable optical module and counter propagates relative to payload carrying signals on the optical fiber link; and
the first node comprises:
a first subsystem monitoring the Raman wavelengths to the optical fiber link towards the second node;
a second subsystem transmitting the first wavelength for the low bandwidth communication channel, wherein the first wavelength is further configured to provide optical time domain reflectometer (OTDR) functionality; and a third subsystem receiving the second wavelength for the high bandwidth communication channel, wherein the second wavelength is terminated on the pluggable optical module and narrowband filtered prior to the pluggable optical module.

14. An optical node, comprising:
a Raman amplifier configured to provide counter propagating Raman pump wavelengths to an external fiber span with high loss, via a first filter;
a second filter configured to provide a first communication channel to a first module, wherein the first communication channel comprises a high bandwidth communication channel providing full operations, administration, maintenance, and provisioning (OAM&P) communication with a downstream node on the external fiber span;
a third filter configured to provide a second communication channel to a second module, wherein the second communications channel comprises a low bandwidth communication channel providing a subset of OAM&P communication with the downstream node on the external fiber span; and
a controller configured to operate concurrently with a second controller at the downstream node and configured to select between the high bandwidth communication channel and the low bandwidth communication channel based on a plurality of operational factors.

15. The optical node of claim 14, wherein the plurality of operational factors comprises whether the Raman amplifier is operational, overall loss on the external fiber span, and launch power of the high bandwidth communication channel.

16. The optical node of claim 14, wherein:
the first communication channel comprises a first wavelength modulated with two discrete tones with an adjustable modulation depth; and
the second communication channel comprises a second wavelength which is amplified by the counter propagating Raman pump wavelengths and narrowband filtered to remove any amplified spontaneous emissions from the counter propagating Raman pump wavelengths.

17. An operational method for telemetry over a high loss optical link, comprising:
operating a low bandwidth channel with Raman amplification off on the high loss optical link;
utilizing the low bandwidth channel to communicate a subset operations, administration, maintenance, and provisioning (OAM&P) data over the high loss optical link to enable turn up of the Raman amplification;
when the Raman amplification is on, operating a high bandwidth channel on the high loss link; and
utilizing the high bandwidth channel to communicate full OAM&P data over the high loss optical link.

18. The operational method of claim 17, further comprising:
operating the high bandwidth channel in a counter propagating manner from the low bandwidth channel; and
transmitting the low bandwidth channel in a co propagating manner with payload channels on the high loss optical link.

19. The operational method of claim 17, further comprising:
narrowband filtering the high bandwidth channel to remove amplified spontaneous emissions from the Raman amplification.

20. The operational method of claim 17, further comprising:
operating the high bandwidth channel on the high loss link and having the Raman amplification turned off; and
reverting to the low bandwidth channel upon loss of the Raman amplification.

* * * * *